Aug. 21, 1945.   G. E. FRANCK   2,383,054
PLUG COCK
Filed July 15, 1944
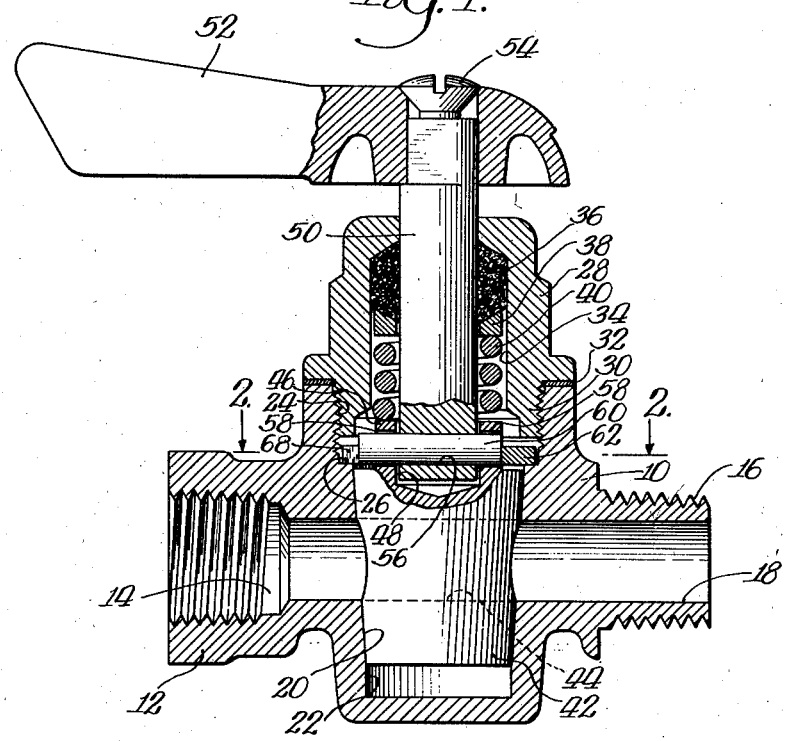
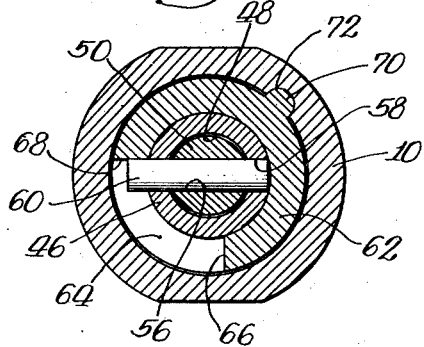
INVENTOR.
George E. Franck,
BY
Vernon D. Beehler
Atty.

Patented Aug. 21, 1945

2,383,054

UNITED STATES PATENT OFFICE 2,383,054

PLUG COCK

George E. Franck, Riverside, Ill., assignor to The Imperial Brass Manufacturing Company, Chicago, Ill., a corporation of Illinois Application July 15, 1944, Serial No. 545,096

5 Claims. (Cl. 251—152)

My invention relates to manually controlled fluid valves and particularly to valves commonly designated as plug cocks.

Among the objects of my invention is to provide a new and improved plug cock which is simple and inexpensive and which has all of the working parts concealed within the body of the cock.

Another object of my invention is to provide a new and improved plug cock which has a floating connection between a plug and a stem therefor so that they may be adjusted into their respective places independently of each other.

Still another object of my invention is to provide a floating connection between the stem and the plug so that after the plug cock has been assembled and the plug lapped into place upon its seat, it will continue to hold its adjustment even though the alignment of the handle connected to it may be disturbed by a careless operator.

Another object still is to incorporate into the cock means for determining on and off positions, all parts of which are contained within the body, and some of which at the same time comprise a part of the floating connection between the stem and the plug thereby serving a dual purpose and materially reducing the cost.

With these and other objects in view, my invention consists in the construction, arrangement and combination of the various parts of my device whereby the objects contemplated are attained, as hereinafter more full set forth, pointed out in my claims and illustrated in the accompanying drawing, in which:

Figure 1 is a longitudinal mid-section of the plug cock completely assembled.

Figure 2 is a cross-section taken on the line 2—2 of Figure 1.

Plug cocks in the past have been widely known and used as a simple and inexpensive means of providing a shut-off device in a fluid line. Their chief function has been in fluid lines where the pressure is relatively low. As a result of their wide-spread use, the field has been highly competitive and has been subject to constant attempts to simplify and reduce the cost of items of this kind to the lowest possible figure, sometimes at a sacrifice of efficiency. Because of the fact that the plug and stem are customarily fixed together as one piece for the sake of cheapness, considerable trouble has been experienced in service due to the fact that a slight misalignment of the stem dislodges the plug from its fit.

It is also necessary in shut-off cocks and valves of this type to provide a stop for open and closed positions which can be easily installed and which is positive in its action. This invention is directed to the purpose of combining these desirable features so that they serve a double purpose, permitting the device to retain the benefits of both, while keeping the number of individual parts to a minimum.

In the drawing there is shown a body 10 provided with a boss 12 having a threaded inlet passage 14 and a threaded boss 16 having an outlet passage 18.

Within the body there is provided a tapered chamber 20, having a closed cylindrical extension 22 at the small end. Adjacent the large end is a threaded enlargement 24 which provides a step or shoulder 26 between it and the tapered chamber.

A bonnet 28 is provided with a threaded end 30 positioned within and engaging the threads of the enlargement, there being provided a gasket 32 to effect a seal between the bonnet and the body.

Within the bonnet is a relatively large pocket 34 within which are positioned a mass of packing 36, a packing ring 38 and a spring 40 for holding the packing and ring in place.

A valve plug 42 is provided having the same taper as the taper of the chamber and the plug is fitted snugly within the wall of the chamber and in the course of manufacture lapped to a fluid tight fit. A lateral passage 44 extends through the plug which in open position permits fluid to flow through the cock.

At its large end the plug is provided with an axially extending flange 46 spaced inwardly relative to the adjacent outer periphery of the plug. This flange provides a central pocket 48 which is designed to receive one end of a stem 50 with a relatively loose, sloppy fit. The stem is provided with a handle 52 secured thereto by means of a screw 54.

The stem is further provided with a lateral passage 56 and the flange 46 is likewise provided with lateral passages 58 on diametrically opposite sides of the flange in such a position that they can be aligned with the lateral passage 56 in the stem.

A pin 60 extends through the lateral passage 56 of the stem and outwardly through the passages 58 in the flange, fitting very loosely within the flange passages. The pin serves to attach the stem to the plug with a loose, floating fit but at the same time permits the plug to be rotated by means of the stem.

Also within the enlargement in the body there is provided a flat washer 62 having a somewhat semi-circular form such that there is a segmental opening 64 between adjacent ends 66 and 68 of the washer. The washer, as shown in Figure 1, rests upon the shoulder 26 at the bottom of the enlargement 24.

On one side, the washer is provided with a lug 70 and the enlargement 24 is provided with a niche 72 designed to receive the lug 70 and thereby fix the position of the washer. As best seen in Figure 2, the pin 60 extends outwardly beyond the outside surface of the flange 46. The pin is there shown abutting the end 68 of the washer, thereby establishing a stop for the plug in full open position. The end 66 of the washer is shown in a position 90 degrees from the end 68 so that when the plug is rotated through an angle of 90 degrees to closed position, the pin will be stopped against the end 66.

By this simple expedient therefore, the pin which forms a loose floating attachment between the stem and the plug, likewise serves as a detent or stop to fix the open and closed positions of the cock.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. A valve having fixed open and closed positions comprising a body having a chamber and inlet and outlet passages communicating therewith and a recess at one end of the chamber, a bonnet attached to the body closing the recess, a valve element in the chamber and a stem extending from the chamber through the bonnet, said valve element having a central pocket at one end adapted to loosely receive one end of the stem, said valve element having radial passages and said stem having a corresponding radial passage and a pin engaging said passages for loosely securing the stem to the valve element, a stop member comprising a washer having a fixed position in the recess and shoulders forming a segmental opening on one side, said pin having one end positioned in said opening between the shoulders having respectively a position against one shoulder in closed position for the valve and a position against the other shoulder in open position thereof.

2. A plug cock having fixed open and closed positions comprising a body having a chamber and inlet and outlet passages communicating therewith, said chamber having an enlargement at one end thereof, a bonnet having one end engaging the body adjacent said enlargement, a stem, and a plug seated in said chamber having a lateral passage therethrough, an axially extending flange at one end of the plug spaced inwardly from the outer periphery and providing a central pocket for one end of the stem, said flange and the adjacent end of the stem having aligned, radial passages and a pin extending loosely through said radial passages and protruding at one end beyond the outside wall of the flange, a flat washer surrounding the flange having a segmental opening at one side thereof, interengaging means on the body within said enlargement and on the washer for fixing the position of the washer, said pin having one end positioned in the segmental opening adapted to abut the sides of the opening respectively in open and closed positions of the cock.

3. A plug cock having fixed open and closed positions comprising a body having a chamber and inlet and outlet passages communicating therewith, said chamber having an enlargement at one end thereof, a bonnet having one end engaging the body adjacent said enlargement, a stem, and a plug seated in said chamber having a lateral passage therethrough, said plug having an aperture at one end providing a loose central pocket for one end of the stem, a pin attached to the plug and stem for loosely holding them together, a stop element in the enlargement and having a fixed position therein providing shoulders for fixing respectively the open and closed positions of the plug, said pin having one end positioned adjacent the stop element shoulders adapted to abut said shoulders respectively in open and closed positions of the cock.

4. A plug cock having fixed open and closed positions comprising a body having a tapered chamber and inlet and outlet passages communicating therewith, said chamber having a threaded enlargement at one end thereof, a bonnet having a threaded end engaged in said enlargement, a stem, and a tapered plug seated in said chamber having a lateral passage therethrough, an axially extending flange at one end of the plug spaced inwardly from the outer periphery and providing a central pocket for one end of the stem, said flange and the adjacent end of the stem having aligned, radial passages and a pin extending loosely through said radial passages and protruding at one end beyond the outside wall of the flange, a flat washer surrounding the flange having a laterally extending lug and a segmental opening at one side thereof, said threaded enlargement having a niche at one side for reception of the lug on the washer and said pin having one end adjacent the inside edge of the washer and the other end positioned in the segmental opening adapted to abut the sides of the opening respectively in open and closed positions of the cock.

5. A plug cock having fixed open and closed positions comprising a body having a tapered chamber and inlet and outlet passages communicating therewith, said chamber having a threaded enlargement at one end thereof, a bonnet having a threaded end engaged in said enlargement, a stem, and a tapered plug seated in said chamber having a lateral passage therethrough, an axially extending flange at one end of the plug spaced inwardly from the outer periphery and providing a central pocket for one end of the stem, said flange and the adjacent end of the stem having aligned, radial passages and a pin extending loosely through said radial passages and protruding at one end beyond the outside wall of the flange, a flat washer surrounding the flange having a laterally extending lug and a segmental opening at one side thereof, said threaded enlargement having a niche at one side for reception of the lug on the washer and said pin having one end adjacent the inside edge of the washer and the other end positioned in the segmental opening adapted to abut the sides of the opening respectively in open and closed positions of the cock, said bonnet having a pocket therein and a packing ring at one end of the pocket, and a spring bearing against the packing ring at one end and at the other end against the flange independently of the washer and stem.

GEORGE E. FRANCK.